April 10, 1928.
H. S. VINCENT
1,665,335
BOOSTER MOTOR TRUCK CONSTRUCTION
Filed July 9, 1926  2 Sheets-Sheet 1
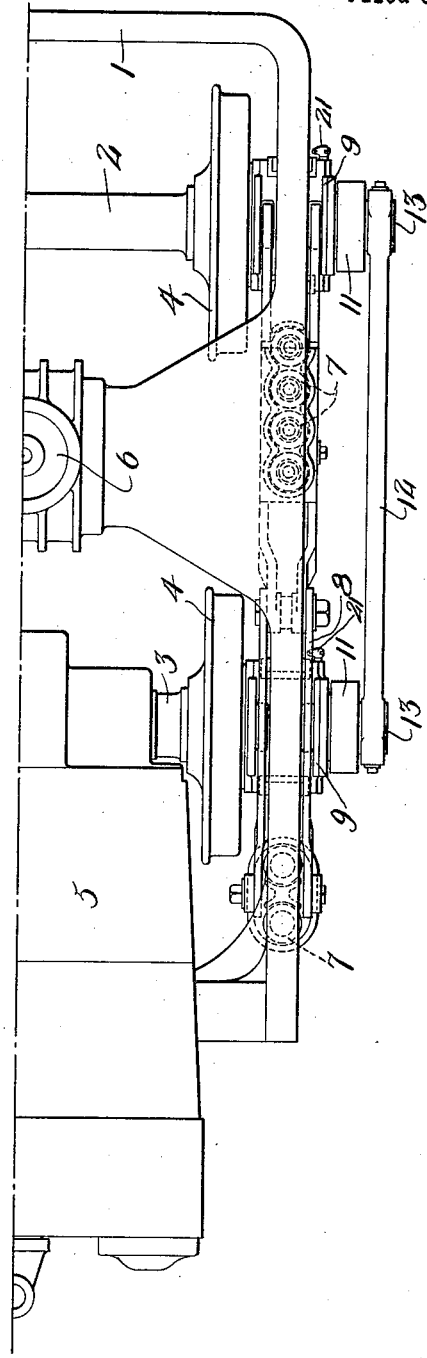
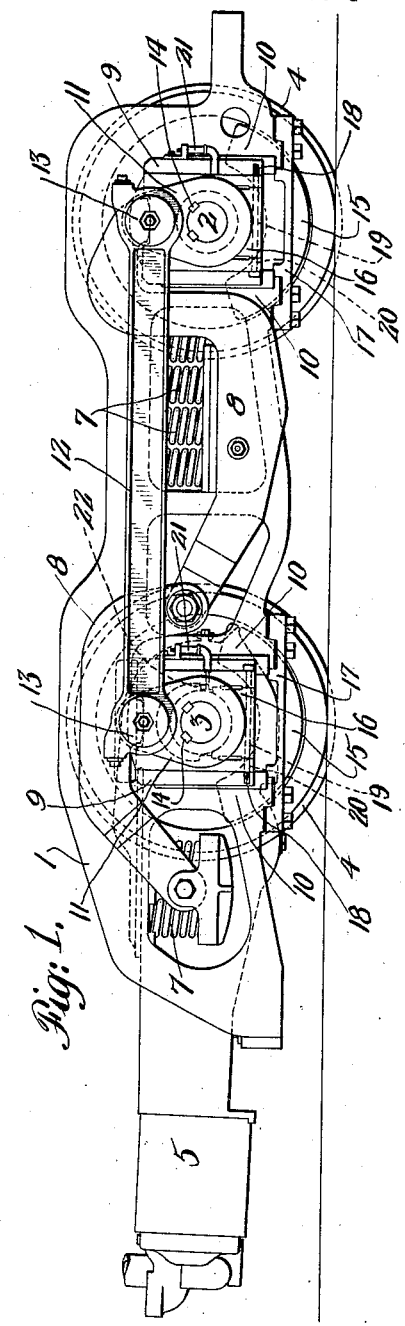
INVENTOR
Harry S. Vincent
BY
ATTORNEYS April 10, 1928.
H. S. VINCENT
1,665,335
BOOSTER MOTOR TRUCK CONSTRUCTION
Filed July 9, 1926    2 Sheets-Sheet 2
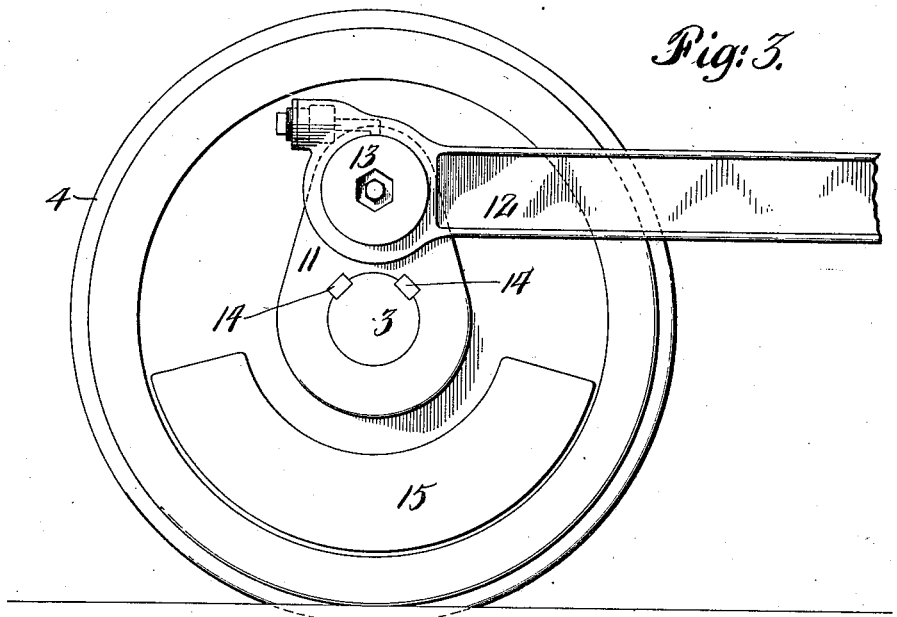
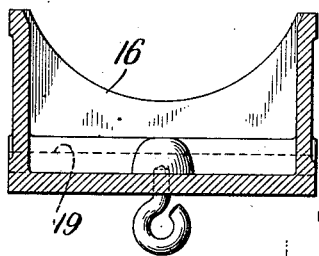
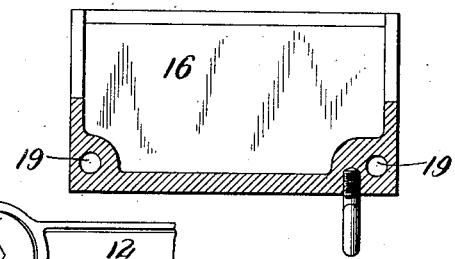
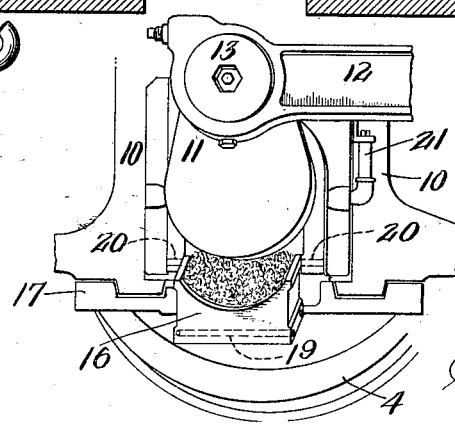

Patented Apr. 10, 1928.

1,665,335

UNITED STATES PATENT OFFICE.

HARRY S. VINCENT, OF RIDGEWOOD, NEW JERSEY, ASSIGNOR TO FRANKLIN RAILWAY SUPPLY COMPANY, OF NEW YORK, N. Y., A CORPORATION OF DELAWARE.

BOOSTER MOTOR-TRUCK CONSTRUCTION.

Application filed July 9, 1926. Serial No. 121,332.

This invention relates to truck construction for locomotive booster motors and is particularly concerned with the provision of an improved means for lubricating the journals of a four-wheeled truck equipped with a booster which is adapted to drive one of the axles directly and the other one thru the intermediation of connecting rods and suitable cranks at the ends of the axles.

Trucks of the foregoing description are commonly employed where the booster is to be applied to the locomotive tender and my invention will be better understood if some of the problems involved in this type of equipment are first enumerated.

As is now well understood in this art booster motors are arranged to have a driving connection to an axle at a point intermediate the wheels and when applied to a truck having two or more axles it is desirable to connect the axle which is directly driven by the booster motor to the other axle or axles by means of suitable cranks at the ends of the axles together with the necessary connecting rods. This arrangement, of course, makes it necessary that the axle boxes be capable of absorbing the driving power. In other words they actually become small driving boxes similar to those which are used on the main drivers of the locomotive. This immediately imposes the necessity of thorough and adequate lubrication and, as stated, my invention relates to a truck construction which embodies the foregoing arrangement of parts together with the necessary means for lubricating the journal box.

The objects of my invention can be specifically stated as involving the provision of a suitable construction in which the lubricating cellar is removable outwardly of the axle. How this together with such other objects as may appear hereinafter or are incident to my invention are attained will appear in connection with the following description of the accompanying drawings in which Fig. 1 is a side elevation of a truck embodying my improvements;

Fig. 2 is a half plan view of the truck;

Fig. 3 is an enlarged side elevation taken at the end of an axle with many of the parts omitted for the sake of bringing out certain details of the invention;

Figs. 4 and 5 are cross and longitudinal sections respectively of the removable cellar; and Fig. 6 is a fragmentary perspective view looking toward the end of an axle to illustrate the manner in which the lubricating cellar is removed.

The truck comprises the frame 1 having the axles 2 and 3, the latter of which is directly driven intermediate its wheels 4 by means of the booster motor 5. The details of the driving connection between the booster motor and the axle 3 are not thought to be necessary to this disclosure inasmuch as they form no part of the present invention.

The load which the truck is designed to carry is received at the center plate 6 and distributed to the axles thru the medium of suitable springs 7 and distributing levers 8 the details of which need not be elaborated upon since they form no part of the present invention. Suffice it to say that the levers are so formed as to carry the weight to the top of the axle boxes 9 which are mounted in the usual manner in the pedestal jaws 10.

At each axle end there is a crank 11 and the adjacent cranks at each side are connected by means of a connecting rod 12 which acts thru the crank pins 13. The crank is keyed to the axle by means of the keys 14.

For a purpose which will appear the counterweights for the cranks and the connecting rods are located on the wheels 4 instead of on the cranks themselves as is customary in constructions of this type. These counterweights 15 appear most clearly in Fig. 3.

It will be noted that I have arranged the axle boxes 9 between the cranks 11 and the wheels 4.

The lubricating cellar 16 fits in between the lower ends of the sides of the box above the pedestal binder 17. It is held in place by means of a pair of transverse pins 18 extending thru holes 19 at each end of the cellar and cooperating holes 20 in the box sides.

The cellar is a simple open ended one which is readily removable outwardly upon removal of the pins 18 when the cranks 11 are in their upper position. As will be evident this could not be arranged for if the counterweights 15 had not been placed upon the wheels instead of on the cranks.

An oiler 21 is provided for each cellar which has communication therewith thru a hole 22 drilled thru a side of the box. This permits of oiling of the lubricator at the end of each trip without the necessity of removing the cellar the latter operation taking place at intervals of say two or three weeks.

I claim:—

1. In truck construction the combination of an axle, a wheel, a crank at the end of the axle, a journal box between the wheel and the crank, and a lubricating cellar in the box removable outwardly below the crank when the latter is in its upper position.

2. In truck construction the combination of an axle, a wheel, a crank at the end of the axle, a counterweight on the wheel, a journal box between the wheel and the crank, and a lubricating cellar in the box removable outwardly below the crank when the latter is in its upper position.

3. In truck construction the combination of an axle, a wheel, a crank at the end of the axle, a counterweight on the wheel, an inverted U-shaped axle box between the wheel and the crank, a lubricating cellar, and pins passing thru the box sides for holding the cellar in position, said cellar being removable outwardly below the crank upon withdrawal of said pins and when the crank is in its upper position.

4. In truck construction the combination of an axle, a wheel, a crank at the end of the axle, a counterweight on the wheel, an inverted U-shaped axle box between the wheel and the crank, a lubricating cellar in the box removable outwardly below the crank when the latter is in its upper position, and an oiler extending thru a box side for oiling the lubricator without removal thereof.

5. The combination of a truck frame, a pair of axles with their wheels, a booster motor having a driving connection to one of said axles between its wheels, a crank at each axle end, a connecting rod between adjacent cranks, a counterweight on each wheel, a driving axle box between each crank and its corresponding wheel, and a journal lubricating cellar in each box removable outwardly below the crank when the latter is in its upper position.

In testimony whereof, I have hereunto signed my name.

HARRY S. VINCENT.